July 22, 1969
K. PRESTON, JR
3,457,425
OPTICAL CORRELATOR MODULATING LIGHT TWICE
IN ULTRASONIC LIGHT MODULATOR
Filed Feb. 24, 1966
2 Sheets-Sheet 1
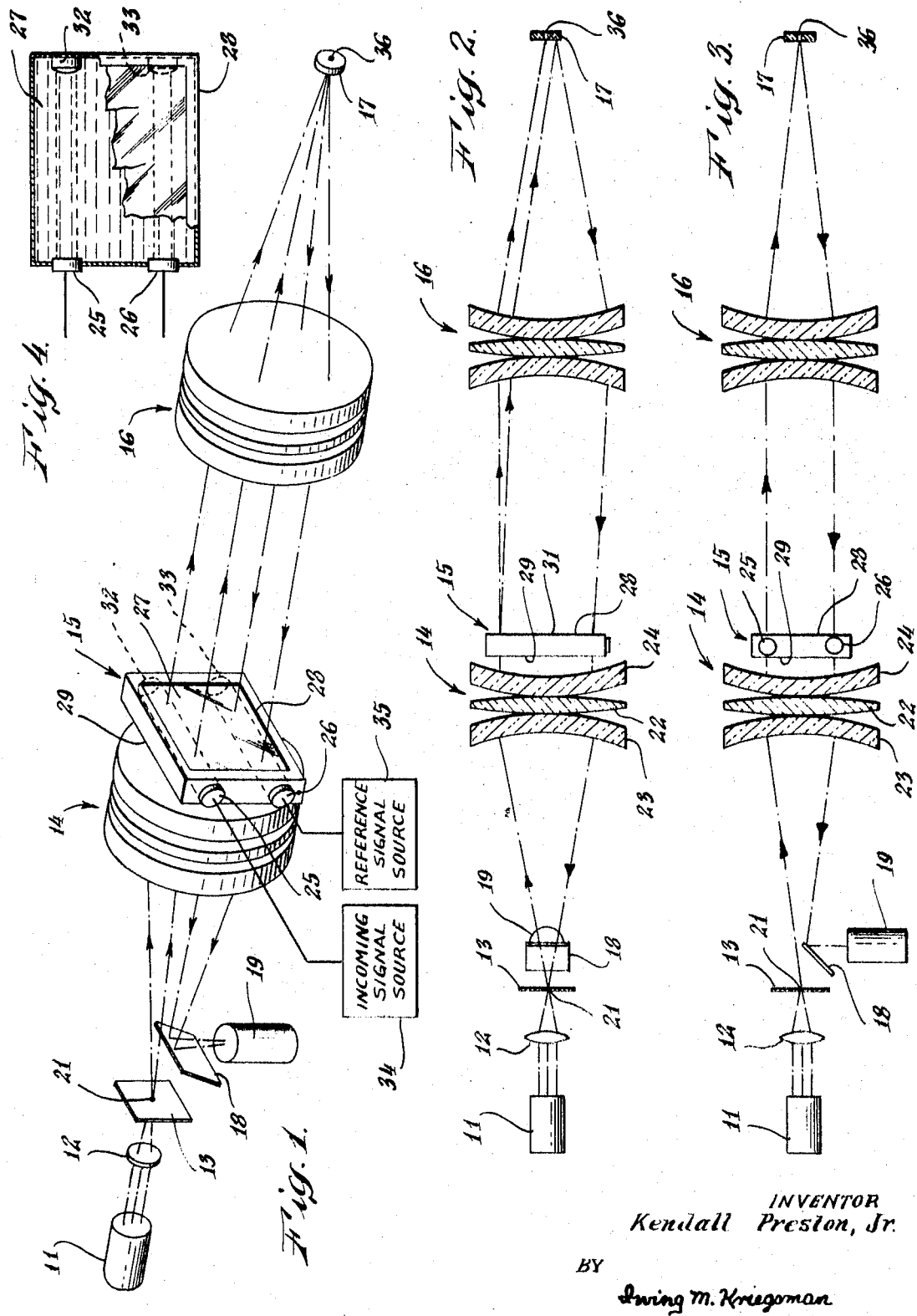

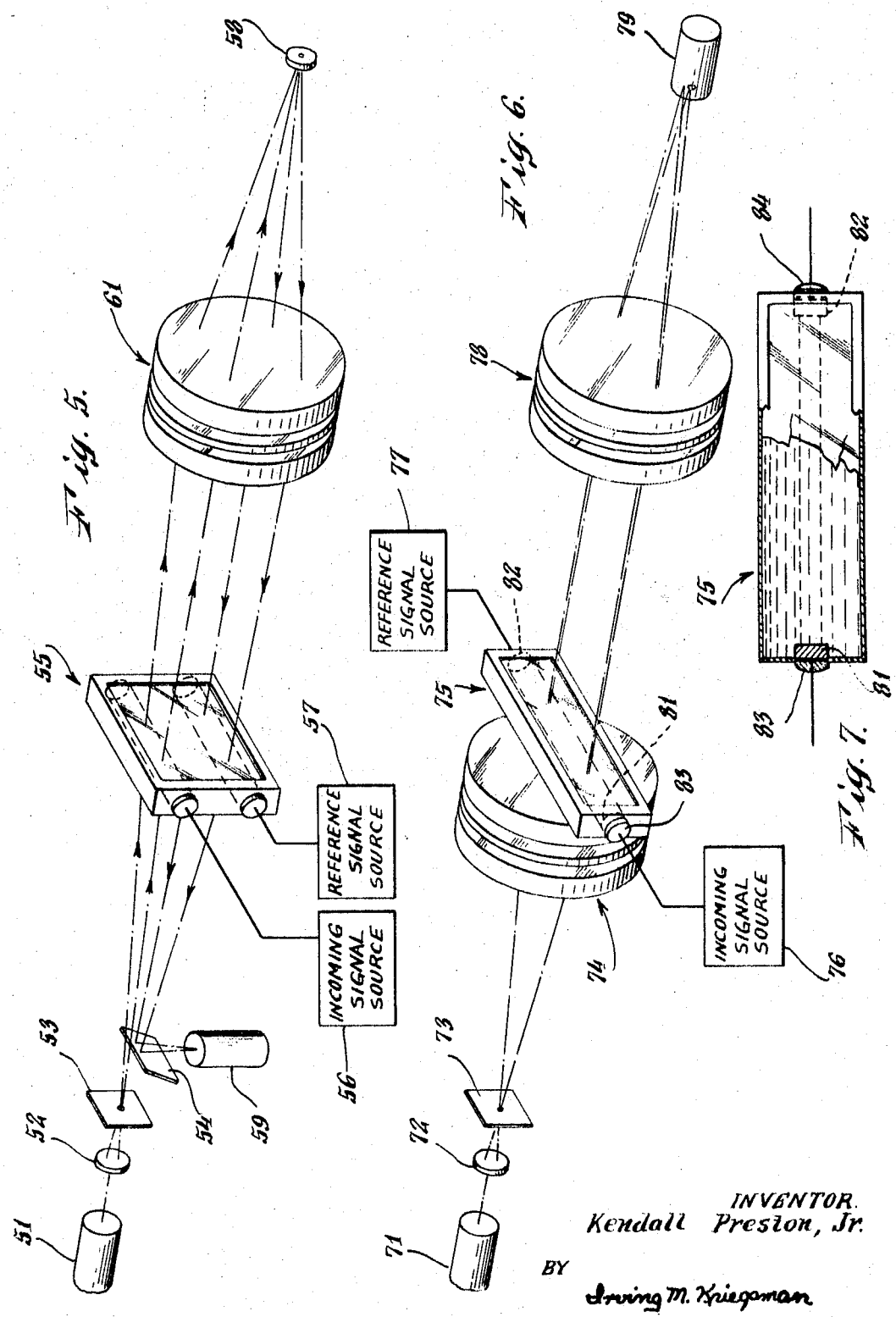

United States Patent Office 3,457,425
Patented July 22, 1969

3,457,425
OPTICAL CORRELATOR MODULATING LIGHT TWICE IN ULTRASONIC LIGHT MODULATOR
Kendall Preston, Jr., New Haven, Conn., assignor to The Perkin-Elmer Corporation, Norwalk, Conn., a corporation of New York
Filed Feb. 24, 1966, Ser. No. 529,846
Int. Cl. G01d 5/34
U.S. Cl. 250—229    5 Claims

ABSTRACT OF THE DISCLOSURE

An apparatus for determining the correlation of two electrical signals. Ultrasonic light modulator means are used to convert the two signals into separate acoustic waves. A coherent beam of light is passed through both of these waves. A phototube measures the intensity of at least a portion of the twice diffracted light; that is, the light diffracted by both waves. This intensity is related to the correlation function. In one embodiment, the two acoustic waves are coaxial and the light is passed through both waves simultaneously. In other embodiments, the two acoustic waves are not coaxial and the light diffracted through one of the acoustic waves is directed through the other acoustic wave.

---

The present invention is related to an apparatus for spatially modulating coherent optical wavefronts by electronic signals. More particularly, the present invention is related to an apparatus for spatially modulating coherent optical wavefronts by electronic signals using ultrasonic energy so as to perform optical correlation.

In most radar, sonar, and communication systems which must operate within limitations of transmitter power or in a jammed environment, it is necessary to enhance signal to noise ratio by using coherent correlation techniques. There exists a coherent optical matched filter arrangement for optimal detection of electronic signals using coherent correlation techniques. The advantages of these techniques over electronic matched filters is that very high coherent time bandwidth products may be achieved. Coherent optical mode matched filters, herein referred to as optical correlators, can be realized with time bandwidth products more than 10 times the maximum product of approximately 1000 available with coherent electronic matched filters.

Correlation is essentially a method wherein the detection and classification of a particular input or plurality of inputs is carried out by continuously comparing the inputs to a reference or plurality of references and noting when match occurs. Involved therein is a continuous multiplication of all the inputs with the reference or references and summation of the product or products over an interval called the correlation interval. Correlators may either be electronic, optical or a combination. Optical correlators, however, have advantages over- electronic correlators because of their greater time bandwidth product and multi-channel capability.

A more complete understanding of optical correlators along with its function and use may be found in U.S. Patent 3,189,746.

Accordingly, it is an object of the present invention to provide for a new and improved optical correlator.

It is another object of the present invention to provide for a new and improved optical correlator utilizing a coherent monochromatic source of light.

It is still another object of the present invention to provide for an optical correlator in which an ultrasonic beam is used for the incoming signal and an ultrasonic beam is used for the reference function.

It is yet still another object of the present invention to provide for a new and improved optical correlator in which a pair of ultrasonic beams propagate side by side in a common ultrasonic medium.

It is another object of the present invention to provide for a new and improved optical correlator in which a pair of ultrasonic beams propagate in opposite directions in a common ultrasonic medium.

It is still another object of the present invention to provide for a new and improved optical correlator in which the collimating and integrating functions are performed by a single lens system.

It is yet still another object of the present invention to provide for a new and improved optical correlator utilizing a reflective spatial filter for removing zero order light.

Other objects and many attendant advantages of the present invention can be readily appreciated as the same becomes understood through reference to the following detailed description when taken in conjunction with the accompanying drawings wherein like reference numerals represent like parts and wherein:

FIGURE 1 is a perspective view of one embodiment of the invention;

FIGURE 2 is a plan view of the embodiment shown in FIGURE 1;

FIGURE 3 is an elevation view of the embodiment shown in FIGURE 1;

FIGURE 4 is a detailed view of the ultrasonic light modulator assembly shown in FIGURE 1;

FIGURE 5 is a perspective view of another embodiment of the invention;

FIGURE 6 is a perspective view of still another embodiment of the invention; and FIGURE 7 is a detailed view of the ultrasonic light modulator assembly in the FIGURE 6 embodiment.

The foregoing and other objects are achieved by means of the present invention in which a new and novel multichannel light modulator assembly is used with various arrangements of optical elements and in which the light employed is monochromatic and coherent. In the new and novel multi-channel light modulator assembly a pair of ultrasonic beams propagate within a common ultrasonic medium. In one arrangement the beams propagate in the same direction in side by side relationship. In another arrangement the beams propagate in opposite directions. Another feature of the present invention involves the use of a reflective spatial filter to remove zero order light. The invention also provides for either a two-lens system in which one of the lenses performs a collimating and integrating function and the other performs a transform and collimating function or a single lens system in which the lens performs both the transform and integrating functions.

Referring to FIGURE 1, there is shown an apparatus of one embodiment of the present invention. Included therein is a laser 11 for producing a source of monochromatic coherent light. Positioned in appropriate spatial relationship along the optical axis defined by the laser beam and in the following order are a condensing lens 12, an apertured diaphragm 13, a combined collimator integrator lens system 14, an ultrasonic light modulator assembly 15, a transform lens system 16 and a reflective spatial filter 17. Disposed between the apertured diaphragm 13 and the collimator integrator lens system 14 but not along the above-mentioned optical axis is a dual purpose mirror 18. Suitably positioned so as to receive light reflected by the dual purpose mirror 18 and also out of the above-mentioned optical axis is a correlation detector 19. Each of the above elements is suitably mounted on an optical bench (not shown) or other similar means well known in the art.

In the embodiment shown the laser 11 employed is a helium-neon laser capable of emitting a monochromatic coherent light at a wave length of 6328 A. It is most advantageous to use a laser insofar as a laser is the most brilliant source of light available, wherein brilliance is defined as the number of photons emitted per unit solid angle and the signal bandwidth over which detection can be detected is directly proportional to the emitted light.

The condensing lens 12 is of the type well known in the art.

The aperture diaphragm member 13 is essentially a non-transmissive plate having an opening 21 in the form of either a pin hole or a slot. The diaphragm member 13 is positioned so that the opening 21 is along the optical axis of the laser 11 and its planar surface normal to the optical axis of the laser 11.

A first lens means in the form of a collimator integrator lens system 14 comprises a combination of lenses designed to collimate light coming from its front focal plane and focus light in its back focal plane. In an actual embodiment that was built and successfully tested, the collimator integrator lens system 14 comprised a double convex center element 22 and two concave meniscus elements 23 and 24 placed on either side of the center element 22.

The multi-channel light modulator assembly 15 is essentially a multi-beam ultrasonic light modulator; that is, an ultrasonic light modulator capable of propagating simultaneously a plurality of ultrasonic beams. This is accomplished by providing for a pair of ultrasonic transducers 25 and 26 which are adapted to be connected to separate electrical signals and which will generate separate traveling waves in an ultrasonic delay medium. In the embodiment shown, the ultrasonic light modulator assembly 15 comprises a container or tank 28 filled with an ultrasonic delay medium in the form of a transparent fluid material 27 such as, for example, water. The sides 29 and 31 of the container 28 that are normal to the optical axis are transparent. Although water is shown as the medium 27 used to contain the ultrasonic wave, other transparent liquids, solids, or gases may be employed. The pair of ultrasonic transducers 25 and 26 are located at one end of the container 28 and a pair of energy absorbers 32 and 33 which may be, for example, rubber are suitably mounted at the other end of the tank 27. One of the ultrasonic transducers 25, is suitably connected to a signal source 34 that is used to generate an incoming signal and the other transducer 26 is connected to a signal source 35 that is used to generate a reference signal which is to be compared with the reference signal.

It should be noted that it is within the scope of this invention to provide for an ultrasonic light modulator assembly having more than two ultrasonic transducers, each of which would carry a different signal and each of which would propagate an ultrasonic beam within the same ultrasonic delay medium.

There is also provided a second lens means in the form of a transform lens 16 which is essentially identical in structure to the collimator integrator lens 14 and serves a dual purpose. One of the functions of the transform lens 16 is to take a Fourier transform of light passing through it from the laser light source 11 and the second function of the transform lens 16 is to image light originally modulated by one of the ultrasonic light modulators and returning through it upon the other ultrasonic light modulator. Additional information relating to the function and use of the transform lens 16 may be found in an article entitled "Use of the Fourier Transformable Properties of the Lenses for Signal Spectrum Analysis" by K. Preston, Jr., Optical and Electro-Optical Information Processing, M.I.T. Press, 1965.

The reflective spatial filter 17 is essentially a mirror formed from either a metalized coating on glass or a multi-layer dielectric coating on glass and has a hole 36 in the center to remove zero order light, i.e., light that has not been modulated by the first ultrasonic light modulator. The reflective spatial filter 17 is positioned with the hole 36 in alignment with the above-mentioned optical axis.

The dual purpose mirror 18 is basically a mirror coated on each side which serves the purpose of both absorbing some of the light passing through the apertured diaphragm 13 and reflecting light transmitted from the collimator integrator lens 14 in the direction of the laser 11. The mirror 18 is positioned so as to prevent light coming through the apertured diaphragm member 13 from entering the lower part of the combined collimator integrator lens 14 and hence from illuminating the lower ultrasonic beam. This is accomplished by positioning the mirror 18 so that its upper edge 37 is as close as possible to the optical axis of the laser 11. The mirror 18 is further positioned so that it intercepts light returning from the collimator integrator lens 14 and reflects the same to the correlation detector 19.

In the embodiment shown the correlation detector 19 is in the form of a photomultiplier. However, other types of light sensitive devices such as, for example, a photoconductor could also be employed.

The diaphragm member 13 is spaced apart from the condensing lens 12 at a distance equal to the focal length of the condensing lens 12. In an actual embodiment of the present invention that was built and successfully tested, a condensing lens 12 having a focal length of 10 mm. was used. The spacing between the diaphragm member 13 and the collimator integrator lens system 14 is equal to the focal length of the collimator integrator lens system 14. In the above mentioned actual embodiment, the collimator integrator lens system 14 had a focal length of 582 mm. The distance between the collimator integrator lens system 14 and the ultrasonic light modulator assembly 15 is not critical and accordingly these two elements may be spaced apart at any convenient distance.

The reflective spatial filter 17 is spaced apart from the transform lens system 16 a distance of 582 mm., which is also equal to the focal length of the transform lens system 16. The distance between the ultrasonic light modulator assembly 15 and the transform lens 16 is critical and is dependent on the particular type of signal being employed. If the signals being used are broad band signals such as, for example, FM or 'chirp" signals, the transform lens 16 must be spaced apart from the ultrasonic light modulator assembly 15 at a distance equal to the focal length of the transform lens 16. However, for other types of signals such as, for example, RF pulse signals, the distance between the transform lens 16 and the ultrasonic light modulator assembly 15 need not be one focal length but may be shortened considerably.

The apparatus operates in the following manner. Light emitted from the laser 11 is focused onto the aperture of the diaphragm member 13 by means of the condensing lens system 12. Light emerging from the aperture of the diaphragm member 13 is partially blocked by the mirror 18 so that it enters only the upper portion of the collimator integrator lens 14. Collimated light emerging from the collimator integrator lens 14 is then used to illuminate the ultrasonic light modulator carrying a traveling wave produced by the ultrasonic transducer 25 which is connected to the incoming signal generator 34. The light defracted by the incoming signal ultrasonic traveling wave which is propagating through the corresponding ultrasonic medium 28 is then separated into its Fourier components by the transform lens system 16. The Fourier transform is formed in the plane of reflective spatial filter 17.

The reflective spatial filter 17 separates the zero order from the first order components of the Fourier transform and returns the first order components through the transform lens system 14. Light emerging from the transform lens system 16 illuminates the ultrasonic light modulator which is formed by the ultrasonic transducer 26 connected to the reference signal generator 35. Light emerging from the ultrasonic light modulator then passes through the collimator integrator lens system 14 which performs a correlation integral of the incoming signal and reference signal. This light is then deflected by means of the mirror 18 into the correlation detector 19.

Referring now to FIGURE 5, there is shown another embodiment of the present invention. This embodiment may be considered a somewhat modified version of the "two-lens system" shown in FIGURES 1–4 and also includes a light source 51, a condensing lens system 52, an apertured diaphragm member 53, a dual purpose mirror 54, an ultrasonic light modulator assembly 55 connected to an incoming signal source 56 and reference signal source 57, a reflective spatial filter 58, and a correlation detector 59. However, in place of the two lenses shown in FIGURE 1, in this embodiment there is only a single lens system 61 which performs both the integrating and transforming functions of the two separate lenses shown in FIGURES 1–4. The reflective spatial filter is placed in the conjugate image plane of the source. The single lens may either be spaced so as to image light diffracted by the traveling ultrasonic waves produced by the incoming signal transducer upon the traveling ultrasonic waves produced by the reference signal transducer or at any convenient distance depending on the characteristics of particular signals being used. The function and operation of this system is basically similar to that shown in the embodiment in FIGURE 1.

In FIGURES 6 and 7, there is shown another embodiment of the present invention. This embodiment is somewhat similar to the embodiment shown in FIGURE 1 and includes a light source 71, a condensing lens 72, an apertured diaphragm 73, a collimator integrator lens 74, an ultrasonic light modulator assembly 75 connected to an incoming signal source 76 and a reference signal source 77, and a transform lens 78. However, in this embodiment the reflective spatial filter is eliminated. In addition, the dual purpose mirror is eliminated. A correlation detector 79 is positioned in place of the reflective spatial filter. This detector is positioned off axis so as to avoid zero order light. In addition, the ultrasonic light modulator assembly is modified so that the beams produced are in opposite directions rather than in the same direction. This is accomplished by poistioning the transducers 81 and 82 on opposite sides of the tank. The two ultrasonic signals produced need not be in different regions of the ultrasonic medium. Accordingly, and to provide a more compact assembly the transducers 81 and 82 are arranged so that they face each other. Each ultrasonic transducer has a pad 83 and 84 for absorbing the ultrasonic wave produced by the other ultrasonic transducer. The operation of this embodiment is somewhat different from the embodiment shown in FIGURE 1 in that collimated light passes through both the signal and reference ultrasonic beams simultaneously and after which the Fourier transform is taken by means of the transform lens 78 and the correlation detector 79 performs the correlation function in the Fourier transform plane. As disclosed in the above cited article entitled "Use of the Fourier Transformable Properties of Lenses for Signal Spectrum Analysis," the electric field in the focal plane of the transform lens is given by $$E_s'(x,y) = \iint_p \bar{f}(x,y) \exp j[w_x x + w_y y] dx dy$$

where $\bar{f}(x,y)$ is the complex expression describing a light modulating signal. In the embodiment shown in FIGURE 6, the transform lens 78 will form the distribution given by $$E'_{\text{inc}}(x,y) + E'_{\text{ref}}(x,y) \qquad (1)$$

when $E'_{\text{inc}}(x,y)$ is the transform of the incoming signal and $E'_{\text{ref}}(x,y)$ is the transform of the reference signal. Also appearing in the back focal plane is the transform of the front focal plane aperture which is called the "zero order." Since the zero order is physically displaced from the light distribution given by (1) it is possible to place the correlation detector so that it intercepts (1) only. When a square law detector is used as the correlation detector its instantaneous output is proportional to the light intensity, namely $$|E'_{\text{inc}}(x,y)|^2 + |E'_{\text{ref}}(x,y)|^2 + |E'_{\text{inc}}(x,y) E'_{\text{ref}}(x,y)|^2 \qquad (2)$$

The final term of Equation 2 is the magnitude of the correlation of the incoming and reference signals as desired. The other terms are unwanted bias terms which can be eliminated by passing the output of the correlation detector through an electronic high pass filter.

It should be understood, of course, that the forgoing disclosure relates to only preferred embodiments of the invention and that numerous alternatives or modifications may be made therein without departing from the spirit and scope of the invention as set forth in the appended claims.

For example, in place of the type of multi-channel ultrasonic light modulator described herein it would be possible to use a multi-channel membrane light modulator such as described in my co-pending U.S. patent application Ser. No. 418,719 or a thermal plastic film type modulator which is written on by an electron beam.

What is claimed is:
1. Apparatus for determining the correlation of two electrical signals comprising:
  (a) means including a coherent light source for generating a diverging beam of coherent light along a fixed path defining an optical axis;
  (b) a plane mirror aligned along the optical axis of the light beam and having a centrally located nonreflective area;
  (c) ultrasonic light modulator means aligned along the optical axis of the light beam in front of the mirror for receiving the two electrical signals and converting each of the two electrical signals into a separate acoustic beam, the two acoustic beams being symmetrically located relative to the optical axis;
  (d) image forming lens means for imaging the light from the source at the plane mirror after it passes through the ultrasonic light modulator means and reimaging the light reflected by the mirror and passed back through the ultrasonic light modulator means;
  (e) means in front of the ultrasonic light modulator means for preventing light from the light source from passing through one of the ultrasonic beams and deflecting away from the light source the reflected light passing back through the ultrasonic light modulator means;
  (f) the size of the centrally located nonreflective area in the plane mirror being such that light diffracted by the other of the two ultrasonic beams is reflected back and the light not diffracted strikes the nonreflective area and is not reflected back; and
  (g) means located at the image plane of the deflected light for measuring the intensity of the deflected light, the deflected light being light diffracted by both acoustic beams;
whereby the intensity of the light measured is related to the correlation of the two signals.

2. The invention according to claim 1 and wherein the coherent light source includes a laser for generating a beam of coherent light, a plate having a pinhole aligned in front of the laser and a lens positioned between the laser and the plate for focusing the light emerging from the laser at the pinhole.

3. The invention according to claim 1 and wherein the ultrasonic light modulator means comprises a cell filled with a light transmissive medium and a pair of ultrasonic transducers in communication with said light transmissive medium.

4. The invention according to claim 1 and wherein image forming lens means comprises a lens positioned between the plane mirror and the ultrasonic light modulator means.

5. The invention according to claim 1 and wherein the image forming lens means comprises a lens positioned between the ultrasonic light modulator means and the plane mirror and lens positioned between the ultrasonic light modulator means and the coherent light source.

References Cited
UNITED STATES PATENTS

| | | |
|---|---|---|
| 2,153,490 | 4/1939 | Wikkenhauser et al. -- 350—161 |
| 2,158,990 | 5/1939 | Okolicsanyi ------ 350—161 X |
| 2,287,587 | 6/1942 | Willard ------------ 350—160 |
| 2,623,165 | 12/1952 | Mueller et al. ------ 250—229 X |
| 2,623,942 | 12/1952 | Schlesinger ------- 350—161 X |
| 2,943,315 | 6/1960 | Rosenthal -------- 350—161 X |
| 3,088,113 | 4/1963 | Rosenthal -------- 350—161 X |
| 3,174,044 | 3/1965 | Tion ------------ 350—161 X |
| 3,189,746 | 6/1965 | Slobodin et al. ------ 250—216 |
| 3,306,977 | 2/1967 | Brueggemann ----- 350—161 X |

ROBERT SEGAL, Primary Examiner

U.S. Cl. X.R.

332—7.51; 350—161